(12) United States Patent
Ramsundar et al.

(10) Patent No.: US 10,639,615 B2
(45) Date of Patent: May 5, 2020

(54) WATER OXIDATION CATALYST HAVING LOW OVERPOTENTIAL FOR OXYGEN EVOLUTION REACTION

(71) Applicant: COUNCIL OF SCIENTIFIC AND INDUSTRIAL RESEARCH, New Delhi (IN)

(72) Inventors: Rani Mohan Ramsundar, Pune (IN); Pattayil Alias Joy, Pune (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 16/339,753

(22) PCT Filed: Oct. 5, 2017

(86) PCT No.: PCT/IN2017/050450
§ 371 (c)(1),
(2) Date: Apr. 5, 2019

(87) PCT Pub. No.: WO2018/066003
PCT Pub. Date: Apr. 12, 2018

(65) Prior Publication Data
US 2020/0047162 A1   Feb. 13, 2020

(30) Foreign Application Priority Data
Oct. 5, 2016 (IN) .............................. 201611034059

(51) Int. Cl.
*B01J 23/06* (2006.01)
*B01J 23/80* (2006.01)
*B01J 37/08* (2006.01)
*B01J 37/04* (2006.01)
*B01J 35/10* (2006.01)
*B01J 35/02* (2006.01)
*B01J 35/00* (2006.01)

(52) U.S. Cl.
CPC ........... *B01J 23/80* (2013.01); *B01J 35/0033* (2013.01); *B01J 35/023* (2013.01); *B01J 35/1014* (2013.01); *B01J 35/1019* (2013.01); *B01J 37/04* (2013.01); *B01J 37/08* (2013.01)

(58) Field of Classification Search
CPC . B01J 23/80; B01J 37/04; B01J 35/023; B01J 37/08; B01J 35/0033; B01J 35/1019; B01J 35/1014
USPC ......................................................... 502/343
See application file for complete search history.

(56) References Cited

U.S. PATENT DOCUMENTS

2014/0080699 A1   3/2014   Ghose et al.

OTHER PUBLICATIONS

International Search Report and Written Opinion, dated Feb. 13, 2018, for PCT Application No. PCT/IN2017/050450.
Bhandarkar et al., *Effect of Annealing on the Structural and Magnetic Properties of Sol-Gel Synthesized Co Doped ZnO*, 2015 International Conference on Energy Systems and Applications, IEEE, Oct. 30, 2015, pp. 543-545.

(Continued)

*Primary Examiner* — Haytham Soliman
(74) *Attorney, Agent, or Firm* — Alston & Bird LLP

(57) ABSTRACT

The present invention discloses a water oxidation catalyst having composition $Zn_xCo_{(3-x)}O_4$ for splitting water into oxygen and hydrogen gas and a process for the preparation thereof.

9 Claims, 5 Drawing Sheets

(56) References Cited

OTHER PUBLICATIONS

Yadav et al., *Electrocatalytic Properties of Cobalt Ferrites Obtained by Glycine Sol-Gel Route for Oxygen Evolution in Alkaline Medium*, Indian Journal of Chemistry, 2015, 54(A), pp. 1221-1225.
Liu et al., *Hierarchical $Zn_xCo_{3-x}O_4$ Nanoarrays With High Activity for Electrocatalytic Oxygen Evolution*, Chemistry of Materials, 2014, 26, pp. 1889-1895.
Mohaideen et al., *Influence of Initial Particle Size on the Magnetostriction of Sintered Cobalt Ferrite Derived From Nancrystalline Powders*, Journal of Magnetism and Magnetic Materials, vol. 346, Nov. 1, 2013, pp. 96-102.
Qiao et al., One-Step Synthesis of Zinc-Cobalt Layered Double Hydroxide (Zn—Co—LDH) Nanosheets for High-Efficiency Oxygen Evolution Reaction, Journal of Materials Chemistry A, 2015, pp. 1-6.
Wu et al., *Porous Spinel $Zn_xCo_{3-x}O_4$ Hollow Polyhedra Templated for High-Rate Lithium-Ion Batteries*, ACS Nano, vol. 9, No. 6, Jun. 24, 2014, pp. 6297-6303.
Varma et al., *Solution Combustion Synthesis of Nanoscale Materials*, Chemical Reviews, 2016, 116, pp. 14493-14586.
Kumar et al., *Synthesis of Nano-Sized ZnCo2O4 Anchored With Graphene Nanosheets as an Anode Material for Secondary Lithium Ion Batteries*, Electrochimica Acta, vol. 146, Nov. 1, 2014, pp. 577-584.
Koza et al, "Electrodeposition of Crystalline $Co_3O_4$—a Catalyst for the Oxygen Evolution Reaction," *Chemistry of Materials*, Aug. 24, 2012, pp. 3567-3573.

WATER OXIDATION CATALYST HAVING LOW OVERPOTENTIAL FOR OXYGEN EVOLUTION REACTION

CROSS REFERENCE TO RELATED APPLICATIONS

This application is a National Stage Application, filed under 35 U.S.C. § 371, of International Application No. PCT/IN2017/050450, filed Oct. 5, 2017, which international application claims priority to Indian Application No. 201611034059, filed Oct. 5, 2016; the contents of both of which as are hereby incorporated by reference in their entirety.

BACKGROUND

Related Field

The present invention relates to a water oxidation catalyst. More particularly, the present invention relates to a water oxidation catalyst for splitting water into oxygen and hydrogen gas and a process for the preparation thereof.

Description of Related Art

Electrochemical water splitting is one of the ideal ways for the production of hydrogen at room temperature without the emission of $CO_2$ and the starting material is only water, which is available plenty in the sea. It has two half cell reactions namely oxygen evolution at the anode and hydrogen evolution at the cathode. Oxygen evolution reaction is more energy demanding and sluggish reaction compared to hydrogen evolution reaction and requires higher overpotential. An electrocatalyst plays an important role to minimize the energy, thereby reducing the overpotential at lower cost. If the electricity needed for water splitting utilized from the windmills, photovoltaic solar cells or from photoelectrochemical cells, the whole process of water splitting will become greener and hydrogen can be produced at free of cost at the expense of renewable energy like sunlight and the wind. In electrolysis of water, 70% of the total cost of the production of hydrogen is due to the amount of electricity used. Therefore, developing an efficient catalyst for oxygen evolution with low overpotential will reduce the cost of hydrogen production.

Article titled "Hierarchical $Zn_xCo_{3-x}O_4$ nanoarrays with high activity for Electrocatalytic Oxygen Evolution" by Xijun Liu et al. published in *Chemistry of Materials*, 2014, 26, pp 1889-1895 reports the design and fabrication of efficient and inexpensive electrodes for use in the oxygen evolution reaction (OER) is essential for energy-conversion technologies. In this study, high OER performance is achieved using novel hierarchical $Zn_xCo_{3-x}O_4$ nanostructures constructed with small secondary nanoneedles grown on primary rhombus-shaped pillar arrays. $Zn(NO_3)_2.6H_2O$ and $Co(NO_3)_2.6H_2O$ at an appropriate molar ratio, x (x=0, 1:4, 1:3, and 1:2), were mixed in 50 mL of distilled water at room temperature. Article titled "Solution combustion synthesis of nanoscale materials" by Arvind Varma et al. published in *Chemical Reviews*, 2016, 116, pp 14493-14586 reports reaction in nickel nitrite-glycine system in the self propagating combustion mode. One-step synthesis of Ni or NiO catalysts supported on silica ($SiO_2$) prepared by combustion of nickel nitrate-glycine-ammonium nitrate reactive gels impregnated onto porous $SiO_2$. Glycine is used as fuel.

Article titled "Electrodeposition of crystalline $Co_3O_4$—A Catalyst for the Oxygen Evolution Reaction" by Jakub A. Koza et al. published in *Chemistry of Materials*, 2012, 24, 3567-3573 reports the catalytic activity of $Co_3O_4$ for the oxygen evolution reaction (OER) of the crystalline and amorphous films is compared by Tafel analysis in alkaline solution at pH 14.

Article titled "Electrocatalytic properties of cobalt ferrites obtained by glycine sol-gel route for oxygen evolution in alkaline medium" by Yadav, Ritu et al. published in *Indian Journal of Chemistry*, 2015, 54(A), pp 1221-1225 reports nano-sized cobalt ferrites have been synthesised by novel sol-gel auto combustion route using a mixture of glycine and ammonium nitrate as fuel with stoichiometric ratio of metal nitrates. The materials so obtained, are characterized by X-ray diffraction, scanning electron micrographs and IR data.

Article titled "One-step synthesis of zinc-cobalt layered double hydroxide (Zn—Co-LDH) nanosheets for high-efficiency oxygen evolution reaction" by Chen Qiao et al. published in *Journal of Materials Chemistry A*, 2015, 13 reports porous zinc-cobalt layered double hydroxide (Zn—Co-LDH) nanosheets by using a one-step microwave-assisted approach, and examine their oxygen evolution reaction (OER) performance.

Article titled "Influence of initial particle size on the magnetostriction of sintered cobalt ferrite derived from nanocrystalline powders" by Khaja Mohaideen et al. published in *Journal of Magnetism and Magnetic Materials*, Volume 346, p. 96-102 reports nanoparticles of cobalt ferrite with different sizes in the range 3-80 nm are synthesized by an autocombustion method using metal nitrates and glycine.

Currently, the precious metal oxides like $RuO_2$ and $IrO_2$ are used as anode materials for the oxygen evolution reaction. Given the scarcity and cost of noble metals like Ru and Ir, designing a catalyst from the earth abundant elements without compromising the activity with low overpotential for oxygen evolution is highly inevitable to make the whole process energy efficient and economically feasible. Hence, designing a cheaper catalyst from the earth abundant elements with low overpotential for oxygen evolution is an important problem.

Therefore, there is need designing a cheaper catalyst from the earth abundant elements with low overpotential for oxygen evolution is an important problem. Accordingly, the present invention provides a Zn substituted nanocobalt oxide ($Co_3O_4$) as an efficient electrocatalysts with superior performance for the oxygen evolution reaction with very low overpotentials against the costly precious metal oxides ($RuO_2$ and $IrO_2$).

BRIEF SUMMARY

The main objective of the present invention is to provide a water oxidation catalyst for splitting water into oxygen and hydrogen gases.

Another objective of the present invention is to provide a water oxidation catalyst having composition $Zn_xCo_{(3-x)}O_4$ for splitting water into oxygen and hydrogen gases.

Still another objective of the present invention provides a process for the preparation of water oxidation catalyst.

Accordingly, the present invention provides a water oxidation catalyst for splitting water into oxygen and hydrogen gases having composition $Zn_xCo_{(3-x)}O_4$ Wherein X is selected from 0, 0.2, 0.4, 0.6, 0.8 and 1.0, characterized in that said catalyst is prepared by the process comprising the steps of:

a) dissolving cobalt nitrate hexahydrate and zinc nitrate hexahydrate separately in solvent to afford solution of both;
b) adding said both solutions to the solution of glycine in solvent followed by stirring to obtain a uniform solution;
c) evaporating the solution of step (b) at temperature in the range of 180 to 220° C. followed by burning the resulting thick mass to obtain a water oxidation catalyst.

In preferred embodiment, said solvent of step (a) is water,
In another preferred embodiment, said water oxidation catalyst is $Zn_{0.8}Co_{2.2}O_4$.
In still another preferred embodiment, said catalyst $Zn_xCo_{(3-x)}O_4$ is used as oxygen evolution catalyst.
In yet another preferred embodiment, said water oxidation catalyst shows electrocatalytic activity with low overpotential in the range of 0.25 V to 0.27 V, at 10 mA cm$^{-2}$.
In still yet another preferred embodiment, said water oxidation catalyst shows electrocatalytic activity with low overpotential of 0.254 V, at 10 mA cm$^{-2}$.
In an embodiment, the present invention provides Magnetic moments study of said water oxidation catalyst $Zn_xCo_{(3-x)}O_4$.

DETAILED DESCRIPTION OF VARIOUS EMBODIMENTS

The invention will now be described in detail in connection with certain preferred and optional embodiments, so that various aspects thereof may be more fully understood and appreciated.

The present invention provides a water oxidation catalyst having composition $Zn_xCo_{(3-x)}O_4$, for splitting water into oxygen and hydrogen gases
Wherein x is selected from 0, 0.2, 0.4, 0.6, 0.8 and 1.0, characterized in that said catalyst is prepared by the process comprising the steps of:
a) dissolving cobalt nitrate hexahydrate and zinc nitrate hexahydrate separately in solvent to afford solution of both;
b) adding said both solutions to the solution of glycine in solvent followed by stirring to obtain a uniform solution;
c) evaporating the solution of step (b) at temperature in the range of 180 to 220° C. followed by burning the resulting thick mass to obtain a zinc cobalt oxide.

In preferred embodiment, said solvent of step (a) is water.
In another preferred embodiment, said water oxidation catalyst is $Zn_{0.8}Co_{2.2}O_4$.
In yet another preferred embodiment, said water oxidation catalyst shows electrocatalytic activity with low overpotential in the range of 0.25 V to 0.27 V, at 10 mA/cm$^2$.

In still another preferred embodiment, said water oxidation catalyst shows electrocatalytic activity with low overpotential of 0.254 V, at 10 mA/cm$^2$.
In still another preferred embodiment, said catalyst $Zn_xCo_{(3-x)}O_4$ is used as oxygen evolution catalyst.

The power diffraction and TEM studies shows that all the catalysts are comprised of spinel structure and spherical in shape with the size range of 7-10 nm. Gas absorption studies shows that all the catalysts have the surface area in the range of 70-120 m$^2$/g. All the catalysts have been tested for their electrocatalytic oxygen evolution.

Figure 1:
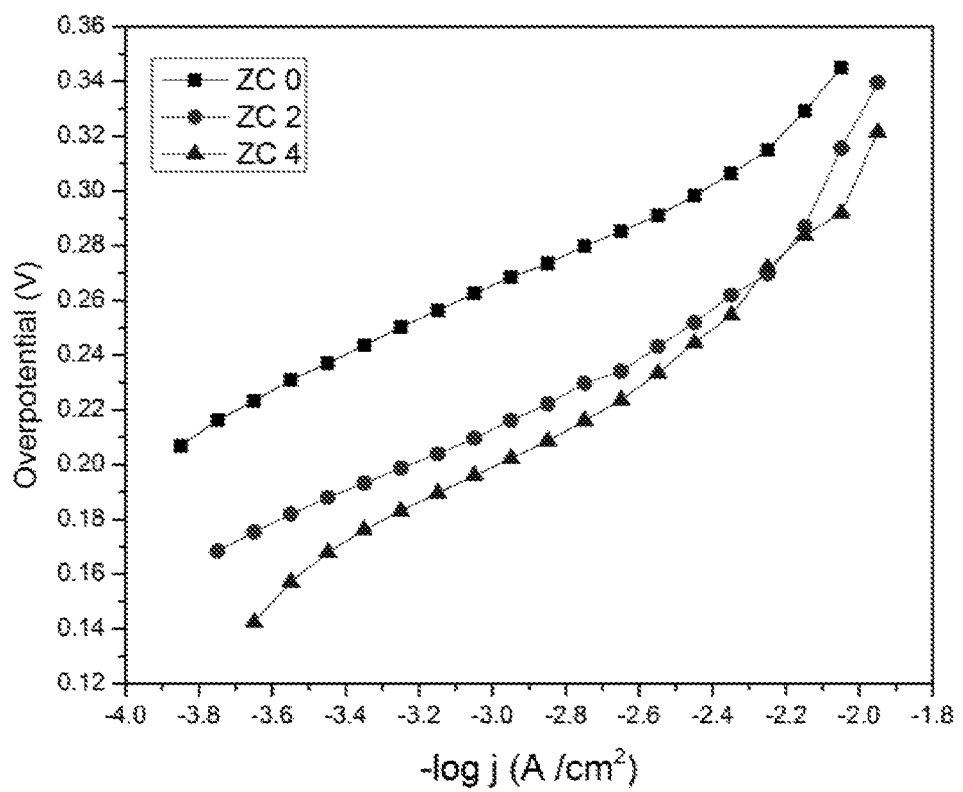
FIG. 1: Tafel plots of ZC0 ($Co_3O_4$), ZC2 ($Zn_{0.2}Co_{2.8}O_4$) and ZC4 ($Zn_{0.4}Co_{2.6}O_4$)
Figure 2:
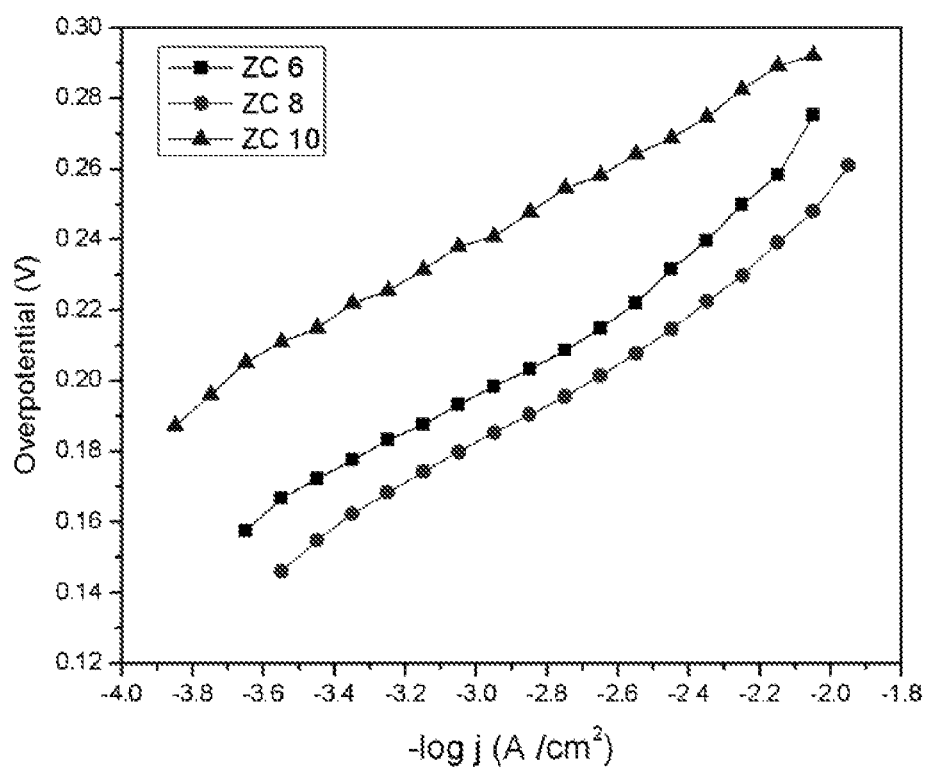
FIG. 2: Tafel plots of ZC6 ($Zn_{0.6}Co_{2.4}O_4$), ZC8 ($Zn_{0.8}Co_{2.2}O_4$) and ZC10 ($ZnCo_2O_4$)

From the Tafel plots of FIG. 1 and FIG. 2 the overpotential values are noted at 10 mA/cm$^2$ (table 1). Table 1 shows overpotential of the respective catalysts obtained from Tafel plots.

TABLE 1

| Catalyst | Overpotential(V) at 10 mA/cm$^2$ |
|---|---|
| $Co_3O_4$ | 0.358 |
| $Zn_{0.2}Co_{2.8}O_4$ | 0.325 |
| $Zn_{0.4}Co_{2.6}O_4$ | 0.306 |
| $Zn_{0.6}Co_{2.4}O_4$ | 0.287 |
| $Zn_{0.8}Co_{2.2}O_4$ | 0.254 |
| $ZnCo_2O_4$ | 0.300 |

Figure 3:
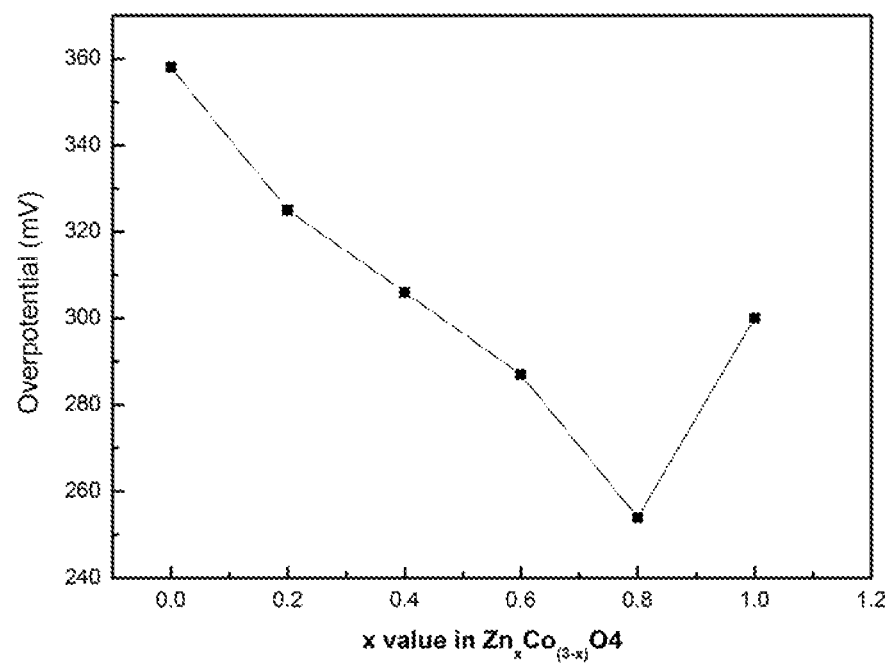
FIG. 3: Variation of overpotential with Zn content in $Zn_xCo_{3-x}O_4$

From FIG. 3 it is observed that when the Zn content(x) in $Zn_xCo_{3-x}O_4$ increases, the overpotential (at 10 mA/cm$^2$) for oxygen evolution reaction decreases and achieves a minimum overpotential of 0.254 V when x=0.8 ($Zn_{0.8}Co_{2.2}O_4$).

Figure 4:
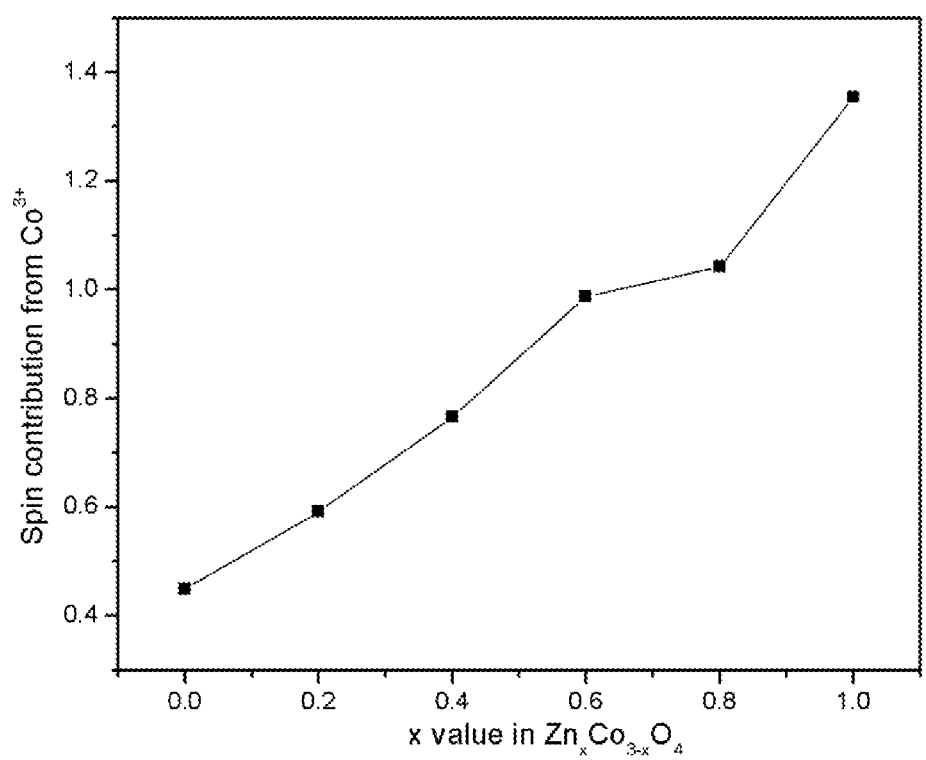
FIG. 4: Variation of $Co^{3+}$ spin contribution with Zn content in $Zn_xCo_{3-x}O_4$

FIG. 4 shows that when the Zn content in $Zn_xCo_{3-x}O_4$ increases, the $Co^{3+}$ spin contribution also increases. This can be due to conversion of low spin $Co^{3+}$ to high spin $Co^{3+}$. The increased population high spin $Co^{3+}$ will increase the $e_g$ electron occupancy. Usually, in Cobalt oxides ($Co_3O_4$), $Co^{3+}$ is in the low spin state and the magnetic moment is only from the $Co^{2+}$. But, in the present invention, detailed magnetic analysis reveals the spin contribution from the $Co^{3+}$.

Figure 5:
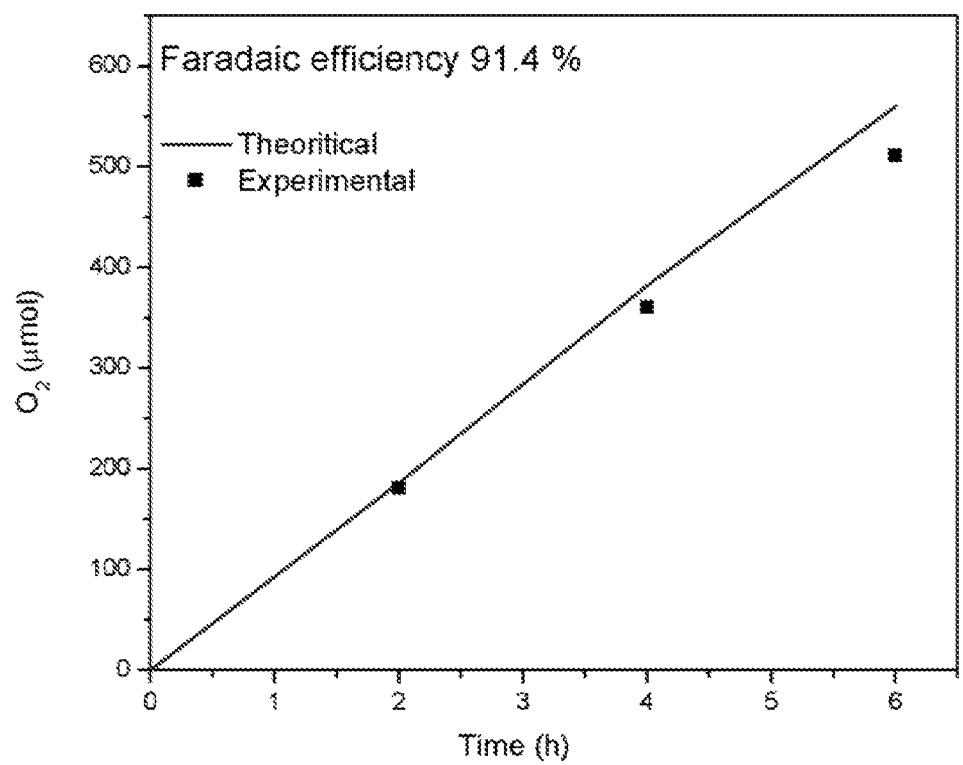
FIG. 5: Quantitative oxygen evolution of ZC 8 at the applied current density of 5 mA/cm$^2$

Quantitative oxygen evolution of catalyst is carried out by applying constant current to calculate the Faradaic efficiency of the reaction. Catalyst (ZC 8) coated on SS316 mesh is used as the anode and platinum foil is used as the cathode. The area of the SS316 mesh is 2 cm$^2$ and the catalyst loading is 1 mg/cm$^2$. A current of 5 mA/cm$^2$ is applied for 6 hours and the gas mixture is analyzed by gas chromatography by every 2 hours. 91.4% Faradaic efficiency is obtained as shown in FIG. 5.

The comparison of overpotential of precious metal oxides and the present catalyst is summarized in table 2. As shown in table 2, $Zn_{0.8}Co_{2.2}O_4$ shows the lowest overpotential (0.254 V) for the oxygen evolution reaction which is comparable to the overpotential values reported for the precious metal oxides $RuO_2$ and $IrO_2$.

TABLE 2

| Catalyst | Overpotential (V) at 10 mA/cm$^2$ |
|---|---|
| Commercial $RuO_2$ | 0.366 |
| $RuO_2$ | 0.256 |
| $IrO_2$ | 0.320 |
| $Zn_{0.8}Co_{2.2}O_4$ | 0.254 |

For the comparison of apparent overpotential of the different catalysts, the loading of the catalyst, electrolyte and electrode support (like Glassy carbon electrode, Ni foam, Ti substrate, etc) should be same. Even though they are different in different reports, to some extend one can roughly compare the overpotential values from the literature reports.

In an embodiment, the present invention provides Magnetic moments study of said water oxidation catalyst $Zn_xCo_{(3-x)}O_4$.

EXAMPLES

Following examples are given by way of illustration therefore should not be construed to limit the scope of the invention.

Example 1: Synthesis of Water Oxidation Catalyst

Stoichiometric amounts of Cobalt nitrate (Co$(NO_3)_2.6H_2O$) and Zinc nitrate Zn$(NO_3)_2.6H_2O$), separately dissolved in minimum amount of distilled water. And added to the particular molar solution of glycine in a minimum amount of distilled water and stirred to obtain a uniform solution. The mixed solution is evaporated at 200° C., on a hot plate. After the evaporation of water, the resulting thick mass is burnt spontaneously to obtain a zinc cobalt oxide. Table 3 shows the mole ratio of metal ions and glycine used in the synthesis of catalyst [ZC0 ($Co_3O_4$), ZC2 ($Zn_{0.2}Co_{2.8}O_4$), ZC4 ($Zn_{0.4}Co_{2.6}O_4$), ZC6 ($Zn_{0.6}Co_{2.4}O_4$), ZC8 ($Zn_{0.8}Co_{2.2}O_4$) and ZC10 ($ZnCo_2O_4$)].

Co$(NO_3)_2.6H_2O$ and Zn$(NO_3)_2.6H_2O$, taken in the required molar ratio, ranging from 0:3 to 1:2, are dissolved in minimum amount of water. Glycine is dissolved in minimum amount of water where the molar ratio of metal nitrate to glycine is in the range of 1:0.45 to 1:0.30. (For example, for the synthesis of $Co_3O_4$(ZC 0), 5 g of cobaltous nitrate was dissolved in 10 ml water and 0.58 g glycine dissolved in 5 ml water and then mixed together. Similarly, for $ZnCO_2O_4$(ZC 10), 1.70 g of zinc nitrate in 5 ml water, 3.33 g cobalt nitrate in 10 ml water, 0.39 g glycine in 5 ml water and mixed together).

Table 3 shows details of composition and mole ratio of metal ions and glycine used.

TABLE 3

| Sample code | Composition | Mole ratio of Zn$(NO_3)_2$•6H$_2$O | Mole ratio of Co$(NO_3)_2$•6H$_2$O | Mole ratio of Metal nitrate to Glycine |
|---|---|---|---|---|
| ZC 0 | $Co_3O_4$ | 0 | 3 | 1:0.45 |
| ZC 2 | $Zn_{0.2}Co_{2.8}O_4$ | 0.2 | 2.8 | 1:0.42 |
| ZC 4 | $Zn_{0.4}Co_{2.6}O_4$ | 0.4 | 2.6 | 1:0.39 |
| ZC 6 | $Zn_{0.6}Co_{2.4}O_4$ | 0.6 | 2.4 | 1:0.36 |
| ZC 8 | $Zn_{0.8}Co_{2.2}O_4$ | 0.8 | 2.2 | 1:0.345 |
| ZC 10 | $ZnCo_2O_4$ | 1 | 2 | 1:0.30 |

The powder X-ray diffraction data is summarized in table 4.

TABLE 4

| Sample Code | Crystallite size (nm) |
|---|---|
| ZC 0 | 7 |
| ZC 2 | 6 |
| ZC 4 | 11 |
| ZC 6 | 12 |
| ZC 8 | 10 |
| ZC 10 | 11 |

The BET surface area of catalysts from gas adsorption measurement is summarized in table 5.

TABLE 5

| Sample Code | BET surface area (m$^2$/g) |
|---|---|
| ZC 0 | 70 |
| ZC 2 | 76 |
| ZC 4 | 106 |
| ZC 8 | 119 |
| ZC 10 | 97 |

Example 2: Synthesis of Water Oxidation Catalyst

Stoichiometric amounts of Cobalt nitrate (Co$(NO_3)_2.6H_2O$) and Zinc nitrate Zn$(NO_3)_2.6H_2O$), separately dissolved in minimum amount of distilled water. And added to the particular molar solution of glycine in a minimum amount of distilled water and stirred to obtain a uniform solution. The mixed solution is evaporated at 200° C., on a hot plate. After the evaporation of water, the resulting thick mass is burnt spontaneously to obtain a zinc cobalt oxide.

Example 3: Electrocatalytic Oxygen Evolution Measurement Study

The power diffraction and TEM studies shows that all the catalysts are comprised of spinel structure and spherical in shape with the size range of 7-10 nm. Gas absorption studies shows that all the catalysts have the surface area in the range of 70-120 m$^2$/g. All the catalysts have been tested for their electrocatalytic oxygen evolution. The catalyst ink has been made by mixing the catalyst with carbon black and nafion (binder) in the ratio of 75:20:5 and dispersed in ethanol water mixture. And further it is sonicated for 30 minutes. Then the catalyst ink is coated on the surface of glassy carbon electrode with the loading of 1 mg/cm$^2$. And it is dried under table lamp for few minutes. For all the electrochemical measurements, 3 mm diameter glassy carbon electrode, Hg/HgO electrode and platinum foil are used as working, reference and counter electrode, respectively. Freshly prepared 0.1 M KOH is used as electrolyte. For Tafel plot data collection, a constant anodic current was applied for 5 min. After that, the steady-state potential was noted. Likewise, ten different currents are applied per decade from $10^{-4}$ to $10^{-2}$ A/cm$^2$. The electrolyte solution was stirred at 400 rpm throughout the experiment to reach the steady state. Before starting the measurement, the solution resistance was measured using iR test function. The resistance value was used to correct the uncompensated resistance manually. Table 6 shows the overpotential values obtained by the use of different catalyst composition at 10 mA/cm$^2$.

TABLE 6

| Sample code | Overpotential(V) at 10 mA/cm$^2$ |
|---|---|
| ZC 0 | 0.358 |
| ZC 2 | 0.325 |
| ZC 4 | 0.306 |
| ZC 6 | 0.287 |
| ZC 8 | 0.254 |
| ZC 10 | 0.300 |

Usually, in Cobalt oxides (Co$_3O_4$), Co$^{3+}$ is in the low spin state and the magnetic moment is only from the Co$^{2+}$. But, in the present invention, detailed magnetic analysis reveals the spin contribution from the Co$^{3+}$. FIG. 4 shows that when the Zn content in $Zn_xCo_{3-x}O_4$ increases, the Co$^{3+}$ spin contribution also increases. This can be due to conversion of low spin $Co^{3+}$ to high spin $Co^{3+}$. The increased population high spin $Co^{3+}$ will increase the $e_g$ electron occupancy. And the direct comparison of $e_g$ occupancy and overpotential is reported in the perovskite systems. But, in spinels, no such report found.

Example 4: Quantitative Oxygen Evolution

Quantitative oxygen evolution has been done by applying constant current to calculate the Faradaic efficiency of the reaction. Catalyst (ZC 8) coated on SS316 mesh is used as the anode and platinum foil is used as the cathode. The area of the SS316 mesh is 2 $cm^2$ and the catalyst loading is 1 $mg/cm^2$. A current of 5 $mA/cm^2$ is applied for 6 hours and the gas mixture is analyzed by gas chromatography in every 2 hours. 91.4% Faradaic efficiency is obtained as shown in FIG. 5.

Example 5: Magnetic Moment Study

Table 7 shows that the Magnetic moment study of said water oxidation catalyst $Zn_xCo_{3-x}O_4$.

TABLE 7

| Sample code | Curie constant (emu K $mol^{-1}$) | Magnetic moment ($\mu_B$) |
|---|---|---|
| ZC 0 | 2.87 | 4.79 |
| ZC 2 | 2.48 | 4.45 |
| ZC 4 | 2.2 | 4.20 |
| ZC 6 | 2.05 | 4.05 |
| ZC 8 | 1.55 | 3.52 |
| ZC 10 | 1.58 | 3.56 |

The catalyst also can be considered as "novel" with respect to the magnetic moment. Because, $Co_3O_4$ and $ZnCo_2O_4$ synthesized by auto combustion method in the present invention possess higher magnetic moment than the reported magnetic moments.

Table 8 shows comparison Magnetic moment study of $Co_3O_4$, $ZnCo_2O_4$ and $Zn_xCo_{3-x}O_4$.

TABLE 8

| Name | Reported magnetic moment (in $\mu_B$) | magnetic moment in the present invention (in $\mu_B$) |
|---|---|---|
| $Co_3O_4$ | 4.27 (ref 1) | 4.79 |
| $ZnCo_2O_4$ | 2.79 (ref 2) | 3.56 |

1. P. Dutta, M. S. Seehra, S. Thota, J. Kumar, Journal of Physics-Condensed Matter 2008, 20, 015218.
2. P. Cossee, Recueil Des Travaux Chimiques Des Pays-Bas-Journal of the Royal Netherlands Chemical Society 1956, 75, 1089-1096.

ADVANTAGES OF THE INVENTION

1. Comparable electrocatalytic activity with that reported for precious metal oxide catalysts, but with low overpotential for oxygen evolution
2. Easy method of synthesis and can be applicable for larger scale
3. Catalyst are based on non-precious and earth abundant elements
4. Process of preparation of catalyst is autocombustion, quick process, half-one hour process, and technique is simple.

The invention claimed is:
1. A process for the synthesis of a water oxidation catalyst having composition $Zn_xCo_{(3-x)}O_4$, for splitting water into oxygen and hydrogen gases, wherein x is selected from 0, 0.2, 0.4, 0.6, 0.8 and 1.0, the process comprising the steps of:
   a) dissolving cobalt nitrate hexahydrate and zinc nitrate hexahydrate separately in solvent to afford solution of both;
   b) adding said both solutions to the solution of glycine in solvent followed by stirring to obtain a uniform solution, wherein the ratio of cobalt plus zinc nitrate or metal nitrate:glycine is in the range of 1:0.3 to 1:0.5; and
   c) evaporating the solution of step (b) at temperature in the range of 180 to 220° C. followed by burning the resulting thick mass to obtain a water oxidation catalyst.

2. The process as claimed in claim 1, wherein said solvent of step (a) is water.
3. The process as claimed in claim 1, wherein said water oxidation catalyst is $Zn_{0.8}Co_{2.2}O_4$.
4. The process as claimed in claim 1, wherein the ratio of cobalt plus zinc nitrate or metal nitrate:glycine is in the range of 1:0.3 to 1:0.45.
5. The process as claimed in claim 1, wherein said water oxidation catalyst shows electrocatalytic activity with low overpotential in the range of 0.25 V to 0.27 V, at 10 mA $cm^{-2}$.
6. The process as claimed in claim 1, wherein said catalyst shows electrocatalytic activity with low overpotential of 0.254 V, at 10 mA $cm^{-2}$.
7. The process as claimed in claim 1, wherein said catalyst is comprised of spinel structure and spherical in shape with the size range of 7-10 nm.
8. The process as claimed in claim 1, wherein surface area of said water oxidation catalyst is in the range of 70-120 $m^2/g$.
9. The process as claimed in claim 1, wherein said catalyst is used as oxygen evolution catalyst.

* * * * *